May 13, 1952     G. TANNER     2,596,877
PROCESS FOR PRODUCING SPONGE METAL
Filed Aug. 15, 1949
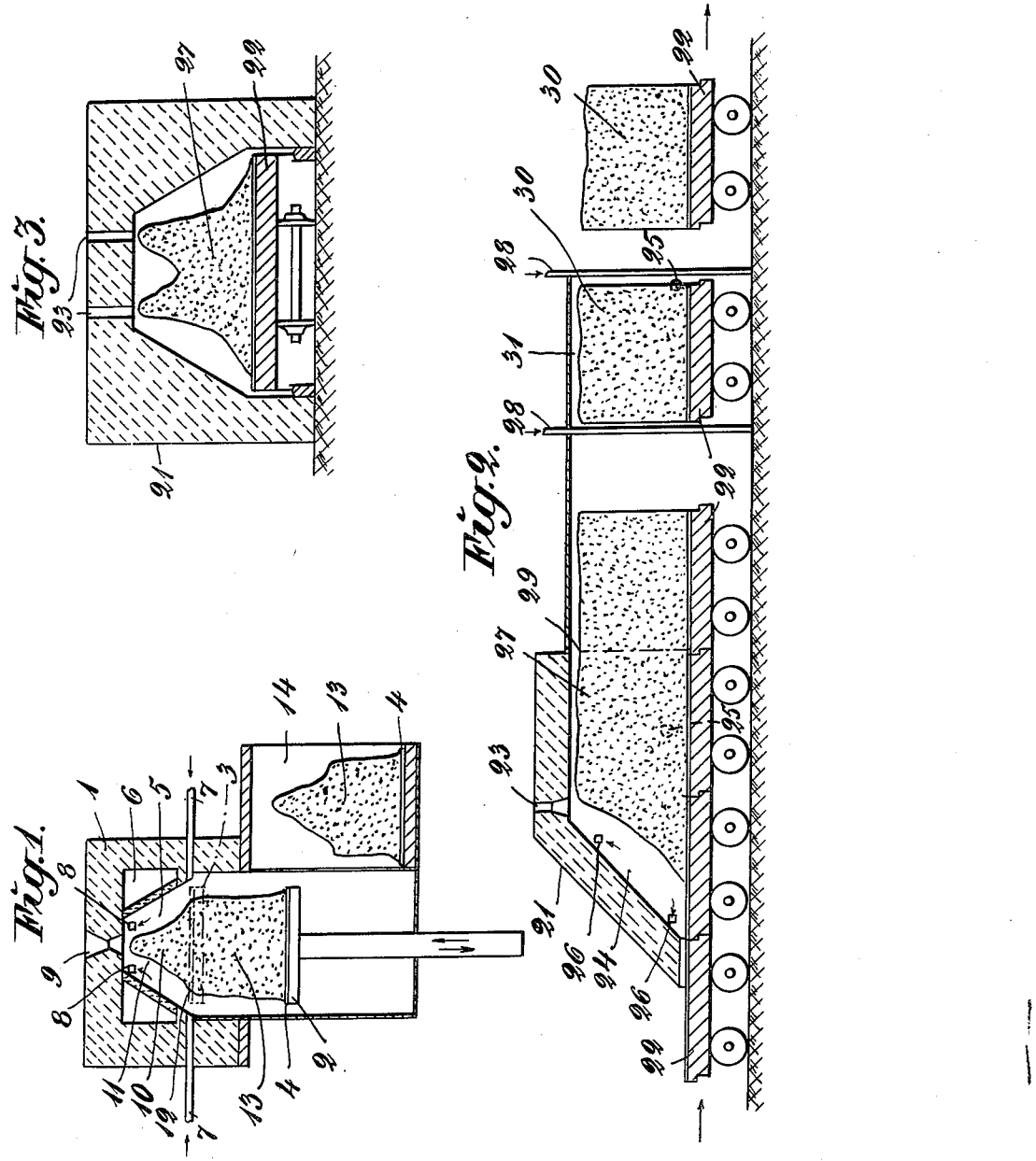
Inventor:
Gustaf Tanner
By: Henry C. Parker
Atty.

Patented May 13, 1952

2,596,877

UNITED STATES PATENT OFFICE 2,596,877

PROCESS FOR PRODUCING SPONGE METAL

Gustaf Tanner, Sala, Sweden

Application August 15, 1949, Serial No. 110,367
In Sweden August 28, 1948

10 Claims. (Cl. 75—33)

1

The present invention relates to a process for producing sponge metal by reducing oxides of metals, selected from the group consisting of iron and copper, at a temperature which is lower than the melting point of the metal in question. Naturally the conditions of working, e. g. the temperature at which reduction is effected, the composition of the gas atmosphere in the reduction furnace and the velocity of the gas supplied to the furnace, will differ in different cases, dependent on the metal oxide to be reduced. However, the process may suitably be described in connection with the reduction of the oxide of a certain metal. Accordingly, as an example, the production of sponge iron from iron oxides will now be described below.

In the processes which have hitherto proved to be useful for continuous production of large quantities of sponge iron, the iron ore is reduced by means of carbon or reducing gases at a temperature of approximately 1000° C. If the temperature is lower the speed of reduction rapidly decreases, and below 900° becomes so low that the application of the process is unpractical. Above 1000° C. the speed of reduction increases, but nevertheless it has not been possible to use temperatures appreciably higher than that in industrial practice. This is due to the fact that in this case the more or less reduced oxide grains will sinter and stick to the wall of the furnace or form lumps or aggregates sintering to each other. This is, for instance, the case when a rotary kiln is used for the reduction, or when the ore grains are kept suspended in hot reducing gases. The space inside the furnace will decrease owing to the accumulation of sintered material, and the process must therefore sooner or later be interrupted. If the reduction is carried out in saggers or muffles, heat must be supplied through a wall and further through an insulating layer of carbon, ore concentrate etc. The wall of the sagger or muffle will be highly strained by heat, while it will be difficult to reach, in a reasonable time, the desired temperature in the center of the charge.

Another difficulty with the processes hitherto employed on a large technical scale is the long time required for the reduction. While a grain of ore concentrate may be reduced in a time to be reckoned in seconds or, at most, minutes, a lump of ore, or a piece of sintered iron ore concentrate, requires a much longer time for reduction. In the known processes actually producing a big tonnage of sponge iron, this time is to be reckoned in days.

2

The present invention now relates to a new process which makes it possible to reduce the metal oxide grains at a high temperature and, consequently, with great rapidity. For this purpose, according to the invention, the oxide grains to be reduced, for instance crushed iron ore or iron ore concentrate, are fed into a furnace, filled with reducing gas at 1100–1200° C. They are deposited on an inclined surface therein, in such a way that the particles do not come in contact with the walls or the roof of the furnace. The oxide grains slide or roll over the inclined surface, but are reduced in the surface layer of the grain practically instantly and sinter to the surface underneath after having passed downwards a certain distance along the same. The reduction then proceeds in the stationary grain which is surrounded almost entirely by the reducing atmosphere in the furnace. After due time, more oxide is fed into the furnace and reduced in the same manner forming a new surface on the previously reduced grains. Experiments have shown that oxide may be fed into the furnace continuously when an iron ore concentrate having a grain size of at most 0.15 mm., preheated to about 900° C. and subjected to a preliminary reduction to FeO, is used. When using grains of larger size, a smaller amount of ore concentrate has to be fed into the furnace per unit of time in order that the degree of reduction should be as high as in the previous case.

In this manner a coherent block of sintered sponge iron grains is formed, the sides of the block being steeper than the sides of a corresponding heap of unsintered oxide. When the block has attained the desired size, it is allowed to cool down in a reducing atmosphere, and may then be treated further in air without being reoxidized.

Sponge iron blocks produced in this manner are very porous which is favourable for the reduction of any oxide which remains when 96–98% of the iron content of the oxide is present as metal. This residue is very difficult to reduce. It is advantageous to proceed in such a way that the nearly completely reduced grains are surrounded by a reducing gas also when they have been buried by the newly introduced material. This may be effected if the reducing gas is caused to pass wholly or partly through the block or body of sponge iron before it enters the furnace room surrounding the block of sponge iron.

When effecting the reduction by means of hydrocarbons, such as natural gas, or oil, or gases formed in the treatment of oil, oil shale, etc., said hydrocarbons are decomposed, whereby carbon is obtained in the form of soot suspended in the gas. This carbon is partly dissolved in the iron and later causes a reduction also in the inner part of the sponge iron block, whereby an outward current of carbon monoxide gas is created. In this manner the remaining oxygen in the sponge iron may be reduced to lower percentages than would otherwise have been possible. Sponge iron containing more carbon than required for the reduction of the remaining oxygen may also be produced according to the invention.

In order to facilitate the removal of the sponge metal thus produced from the bottom of the furnace or from other places where it may be in contact with the limiting surfaces of the furnace room, said places are coated with a layer of any material of such a nature, that the metal will not sinter to the same, e. g. graphite. Or said surfaces can be covered with a sheet of metal, e. g. a plate of iron. Sponge iron sinters to said plate, but the plate does not sinter to the masonry and may be removed from the furance with the block of sponge iron.

The process according to the invention may be carried out in furnaces of different construction. On the accompanying drawing two embodiments of suitable furnaces are shown by way of example.

Fig. 1 shows a furnace 1 provided with a bottom 2 which is movable upwards or downwards. When the formation of a block of sponge iron begins, the bottom 2 may be in the position 3 and placed thereon is a plate of iron 4. The furnace room 5 is heated to the desired temperature, e. g. 1100–1200° C., by supplying a hot reducing gas, electrically, or by burning gas or oil in a special combustion chamber 6. The reducing gas is supplied to the furnace through the channels 7 and discharged therefrom through the channels 8. The oxide grains, e. g. ore concentrate, supplied through the opening 9 settles on an iron plate 4 in the shape of a cone 10 and when more oxide grains are fed into the furnace the grains glide along the surface 11 formed by the previously introduced grains. After gliding a certain distance, the grains sinter to the underlying surface, and hereby the particles which have passed farthest, reach the point 12. The top of the mass of sintered sponge iron is all the while close to the roof of the furnace. The bottom is lowered during the reduction at the same rate as the block of sponge iron increases in height when more oxide grains are introduced. Consequently the surface, on which the reduction and the sintering takes place, is always in the furnace room. The block 13 of sponge iron formed as described may have the shape indicated in Fig. 1. When the block 13 has attained the desired size, it is pushed together with the iron plate 4, into the cooling chamber 14 where it is left to cool down in a reducing atmosphere. In the meantime the movable bottom of the furnace is moved back to its starting position, and the formation of a new block of sponge iron may again begin.

Figs. 2 and 3 show a furnace 21 having a laterally movable furnace bottom 22. The oxide grains are fed through the openings 23 and reduced in the furnace room 24. The gas inlet is indicated at 25 and the gas outlets at 26, and 27 is the block of sponge iron. As the quantity of sponge iron increases, the bottom of the furnace is moved in the direction of the arrow. When the sponge iron block approaches the damper 28, a part of the block 27, which has now been cooled down considerably, is cut off e. g. by means of a saw along the line 29, and the piece 30 thus separated is transferred into the cooling chamber 31.

The gas leaving the furnace may be used for preheating and preliminary reduction of the oxide to be treated. It may also wholly or partially be regenerated by removing oxidizing constituents or converting them into reducing constituents, the gas thus treated being returned to the furnace.

Although the process described above refers particularly to the reduction of iron oxides for the purpose of producing sponge iron, it may also advantageously be applied in reducing other metal oxides for producing other metals. So, e. g. in case of copper oxides, the reduction may be effected in the same manner but at a temperature of about 800° C.

I claim:

1. In the production of sponge metal by reducing oxides of a metal selected from the group consisting of iron and copper, the process which comprises feeding grains of the oxide to be reduced into a furnace onto an inclined surface therein, said surface being formed by grains of the oxide previously reduced and sintered after introduction into the furnace, so as to cause the grains to pass downwardly along said surface, reducing the said oxide grains by contacting them with a reducing gas while maintaining a temperature in the furnace below the melting point of the said metal but sufficiently high to cause the said grains to sinter onto said inclined surface after having passed a distance along the same, moving the so-formed block of sintered grains away from the feeding point substantially as it accumulates and removing it from the furnace.

2. In the production of sponge meal by reducing oxides of a metal selected from the group consisting of iron and copper, the process which comprises feeding grains of the oxide to be reduced into a furnace onto an inclined surface of a block of sponge metal formed therein by grains previously reduced and sintered together, the inclination of said surface being greater than the angle of repose of the oxide grains, so as to cause the grains to pass downwardly along said surface, supplying a reducing gas to the furnace, reducing the said metal oxide to metal by means of said reducing gas while maintaining a temperature in the furnace below the melting point of the said metal but sufficiently high to cause the said grains to sinter onto said inclined surface after having passed a distance along the same, gradually moving the inclined surface away from the feeding point, thus continuously forming new surfaces on the block of sponge metal, while subjecting the grains to the reducing action of the gas, and increasing the size of the sponge metal block and withdrawing the sintered metal out of the furnace.

3. In the production of sponge iron, the procesess which comprises feeding grains of iron oxide into a furnace onto an inclined surface of a block of sponge iron therein, formed by grains previously reduced and sintered together, the inclination of said surface being greater than the angle of repose of the oxide grains, so as to cause the grains to pass downwardly along said surface, supplying a reducing gas to the furnace, reducing the said iron oxide to metal by means of said reducing gas by maintaining a temperature in the furnace below the melting point of iron but sufficiently high to allow the said grains to sinter onto said inclined surface after having passed a distance along the same, gradually moving the inclined surface away from the feeding point, thus continuously forming new surfaces on the block of sponge iron and increasing the size of the sponge metal block and withdrawing the sintered metal out of the furnace.

4. The process of claim 3 wherein the reducing gas contains hydrocarbons so that carbon is separated from the gas at the temperature of reduction and dissolved in the sponge iron, which carbon at least partially is consumed during reduction of the oxide remaining in the sponge iron.

5. The process of claim 3 wherein a reducing gas, formed in the block of sponge iron by interaction of carbon originating from the decomposition of a reducing gas containing hydrocarbons with the remaining oxide in the block of sponge iron, passes at least partially through the block of sponge metal before entering the surrounding gas atmosphere.

6. The process of claim 3 wherein the block of sponge metal when it has attained the desired size is removed from the furnace and cooled in a reducing atmosphere.

7. The process of claim 2 wherein the gas discharged from the furnace is used for preheating the metal oxide before the feeding of the latter into the reduction furnace.

8. The process of claim 2 wherein the gas discharged from the furnace is used for a preliminary reduction of the metal oxide before the feeding of the latter into the reduction furnace.

9. The process of claim 2 wherein the gas discharged from the furnace is regenerated and then returned to the furnace.

10. In the manufacture of sponge metal, the process which comprises feeding a stream comprising grains of an oxide of a metal, selected from the group consisting of iron and copper, onto an inclined surface of a block of sintered sponge metal formed therein and supported by a moveable substantially-horizontal surface located in a reducing furnace, reducing the oxide grains deposited on said surface by heating them in a reducing atmosphere to temperatures sufficiently high to sinter said deposited grains without melting the reduced metal, whereby the block of sponge metal builds up on said moveable surface, gradually moving said surface away from the feeding point until a block is formed sufficiently large to be removed, then passing said block into a cooling chamber supplied with a reducing atmosphere, discharging the cooled block of sponge metal, and repeating the described procedure to form another block of sponge metal.

GUSTAF TANNER.

REFERENCES CITED

The following references are of record in the file of this patent:

UNITED STATES PATENTS

| Number | Name | Date |
| --- | --- | --- |
| 833,406 | Mason | Oct. 16, 1906 |
| 1,004,505 | Verneuil | Sept. 26, 1911 |
| 1,512,262 | Allingham | Oct. 21, 1924 |
| 1,758,786 | Ekelund | May 13, 1930 |
| 2,311,962 | Payne | Feb. 23, 1943 |